(12) United States Patent
Yang

(10) Patent No.: US 8,499,423 B2
(45) Date of Patent: Aug. 6, 2013

(54) PRECISION SAFETY RING-SHAPED HOOK

(75) Inventor: Kai Chieh Yang, Taichung (TW)

(73) Assignee: Aerohook Technology Co., Ltd., Taichung (TW)

( * ) Notice: Subject to any disclaimer, the term of this patent is extended or adjusted under 35 U.S.C. 154(b) by 178 days.

(21) Appl. No.: 13/040,274

(22) Filed: Mar. 4, 2011

(65) Prior Publication Data

US 2012/0102688 A1 May 3, 2012

(30) Foreign Application Priority Data

Oct. 29, 2010 (TW) .............................. 99220953 U

(51) Int. Cl.
*F16B 45/02* (2006.01)

(52) U.S. Cl.
USPC ........................................ 24/600.1; 24/599.6

(58) Field of Classification Search
USPC ............ 24/599.1, 599.4, 599.5, 599.6, 599.7, 24/599.8, 599.9, 600.1, 601.1, 601.5, 601.7; 294/82.19
See application file for complete search history.

(56) References Cited

U.S. PATENT DOCUMENTS

| | | | | |
|---|---|---|---|---|
| 1,879,167 A * | 9/1932 | Freysinger | .................... | 24/599.5 |
| 5,735,025 A * | 4/1998 | Bailey | ........................... | 24/600.1 |
| 7,922,220 B2 * | 4/2011 | Coulombe | ........................ | 292/1 |
| 8,001,663 B2 * | 8/2011 | Belcourt et al. | ............. | 24/599.5 |
| 8,117,721 B2 * | 2/2012 | Yang | ............................ | 24/599.5 |
| 8,276,247 B2 * | 10/2012 | Yang | ............................ | 24/599.9 |
| 2008/0120818 A1 * | 5/2008 | Belcourt et al. | ............. | 24/599.5 |
| 2011/0113603 A1 * | 5/2011 | Yang | ............................ | 24/599.6 |
| 2011/0126386 A1 * | 6/2011 | Liang | ........................... | 24/599.5 |
| 2012/0042487 A1 * | 2/2012 | Yang | ............................ | 24/599.5 |

* cited by examiner

*Primary Examiner* — Robert J Sandy
*Assistant Examiner* — Abigail E Morrell
(74) *Attorney, Agent, or Firm* — Raymond Y. Chan; David and Raymond Patent Firm

(57) ABSTRACT

A precision safety ring-shaped hook provides a timing gauge structure which is composed of a sliding groove, a pair of rail members, and a block pin. Each of the rail members has an arc surface. When a first locking axle is moved to an open slot, a first end of a hook body is moved away from the first guiding member and, at the same time, a block pin moves to the arc surface area, so that when the first locking axle is swung in a hook cavity of the hook body, a driving pin is able to position at the arc surface and thus a locking member can be guided by the arc surface to open the opening of the hook body. Accordingly, the opening or shutting of the opening of the hook body by the locking member can thus be precisely operated at one time to provide an advance precision value for the hook and eliminate the interference and impacting drawbacks.

18 Claims, 7 Drawing Sheets

US 8,499,423 B2

PRECISION SAFETY RING-SHAPED HOOK

BACKGROUND OF THE PRESENT INVENTION

1. Field of Invention

The present invention relates to a precision safety ring-shaped hook, and more particularly to a unique technique for accurately guiding a locking member to open and shut a hook opening.

2. Description of Related Arts

Please refer to a safety hook disclosed in a Taiwan Patent M357531. Although it provides an improved strengthen structure, it is restricted by the structural limitation that the resistant length defined by its pivot portion 311, second pivot axle 136 and restriction portion 313 is much shorter than the force applying length defined by its locking member 31. Therefore, when the free end of the locking member 31 undertakes an external side impact stress, it fails to prevent stress being concentrated at the restriction portion 313 and the blocking portion 213, so that it fails to bear much external side impact stress. Accordingly, the restriction portion 313 and the blocking portion 213 may get loose after a long time operation.

Accordingly, the inventor of the present invention has invented the Taiwan patent M373417, entitled Safety Hook Device, which substantially improves the above drawbacks. However, the inventor does not complacent and discovers that the free end of the locking member thereof may cause interference and impaction with the hook body during the opening and shutting of the hook opening. It will cause the locking member failing to operate correctly in one time that not only increases the complication during operation, but also largely adversely affects the value of the product. Accordingly, there is a desire to improve the Taiwan patent M373417.

SUMMARY OF THE PRESENT INVENTION

The present invention provides a precision safety ring-shaped hook, which generally improves the structure of the locking member and the timing gauge structure of the Taiwan patent M373417, providing the following features:

1. The timing gauge structure is composed of a sliding groove, a pair of rail members, and a block pin, wherein the rail members and the block pin are provided between the second guiding member and the second ear portion correspondingly. Each of the rail members has an arc surface and the sliding groove is penetrated through the second guiding member so as to couple with the second locking axle. Therefore, when the first locking axle is moved to the open slot, the first end of the main wall is moved away from the first guiding member and, at the same time, the block pin moves to the arc surface area, so that when the first locking axle is swung in the hook cavity, the driving pin is able to position at the arc surface and thus the locking member can be guided by the arc surface to open the opening. Accordingly, the opening or shutting of the opening of the hook body by the locking member can thus be precisely operated at one time to provide an advance precision value for the hook and eliminate the interference and impacting drawbacks of the Taiwan patent M373417.

2. The present invention also provides a locking member constructed by a main wall and two side walls to form a U shape frame. In addition, when the first locking axle is retained in the locking slot to shut the opening, the first end of the main wall is biasing against an outer side of the first guiding member, so as to evenly transfer the stress of the locking member to the hook body via the first end of the main wall and the first locking axle, and thus improving the stress concentration shortcoming of the Taiwan patent M373417, wherein the locking member of the present invention is capable of bearing a stress more than 3500 lbs, meeting the safety requirement accordingly.

Additional advantages and features of the invention will become apparent from the description which follows, and may be realized by means of the instrumentalities and combinations particular point out in the appended claims.

DETAILED DESCRIPTION OF THE PREFERRED EMBODIMENT

Figure 1:
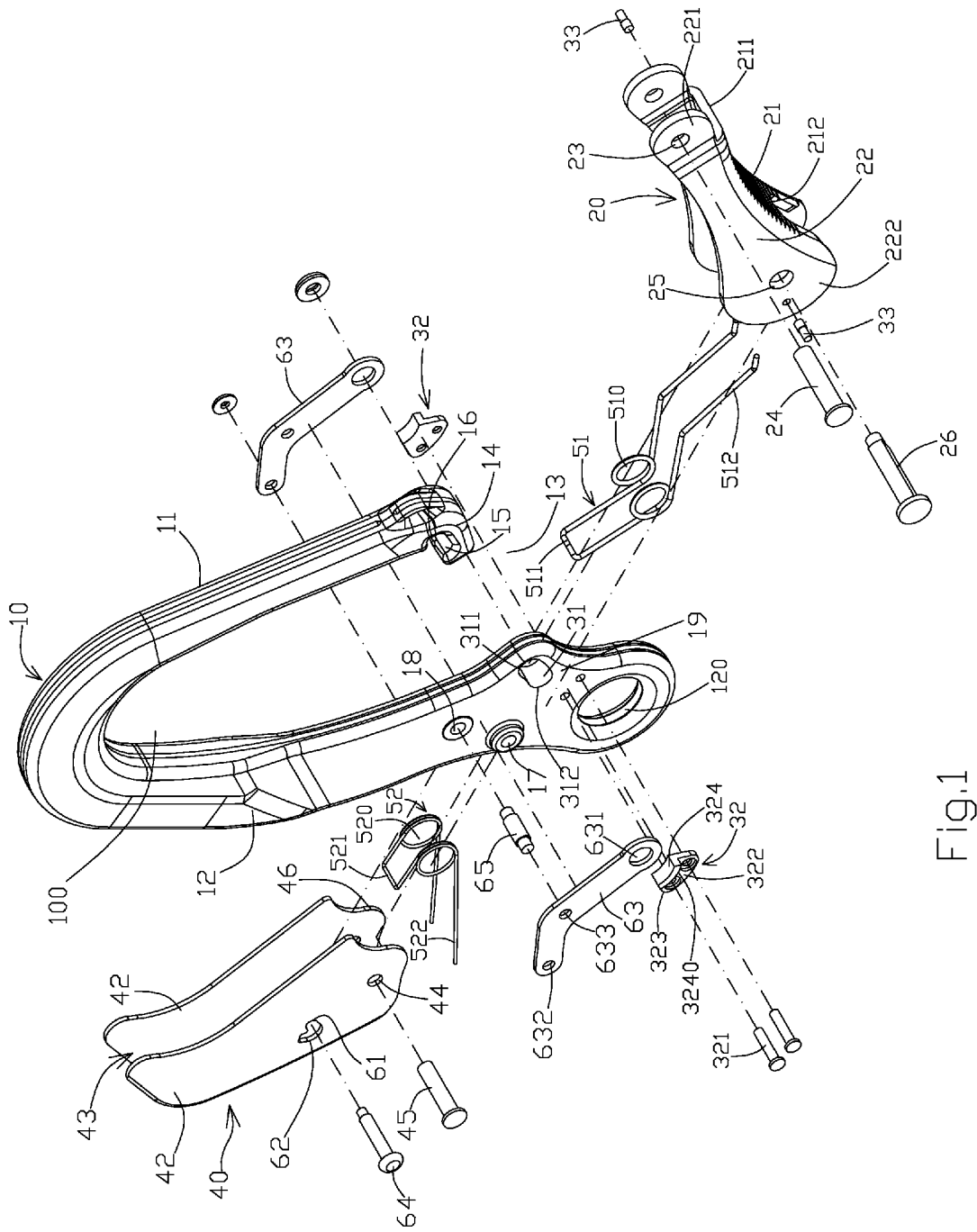
FIG. 1 is an exploded view of a preferred embodiment of the present invention.
Figure 2:
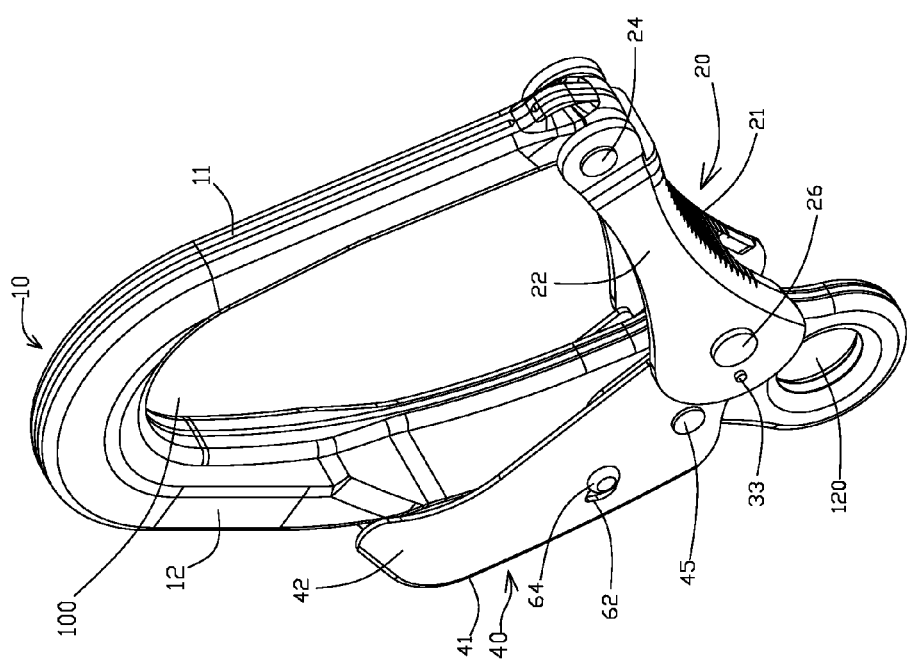
FIG. 2 is a perspective view illustrating a locking condition of the present invention.

Referring to FIGS. 1-6, a precision safety ring-shaped hook according to a preferred embodiment is illustrated, which include a hook body 10 comprising a first arm 11 and a second arm 12, wherein a first end of the first arm 11 is continuously extended to connect with a first end of the second arm 12 defining a closing portion while a second end of the first arm 11 and a second end of the second arm define an opening 13 so as to define a hook cavity 100, penetrating through both front and rear sides of the hook body 10, between the first and second arms 11, 12 of the hook body 10, such that the hook cavity 100 communicates with outside through the opening 13 sidewardly. Another end of the second arm 12 forms a hooking hole 120 while another end of the first arm extends to form a first guiding member 14 which slightly narrows a width of the opening 13. An inner side surface of the first guiding member 14 forms an indented open slot 15 communicating with the hooking cavity 100, and that a locking slot 16 is formed at where the first arm 11 connected with the first guiding member 14, wherein the locking slot 16 and the open slot 15 are extended end to end without communication with the hooking cavity 100. The second arm 12 has a main axial hole 17 and an auxiliary axial hole 18 penetrating through two sides thereof. A second guiding member 19 is provided at the other end of the second arm 12 which slightly narrows the hooking cavity 100 in width too so that the first and the second guiding members 14, 19 are facing with each other with a similar thickness.

A locking member 20, which is adapted to open and shut the opening 13, comprises a main wall 21 and two side walls 22 positioned spaced apart and facing each other to define a U-shape cross section. The main wall has a first end 211 and a second end 212. The two side walls 22 have a length longer than the main wall 21 and form a first ear portion 221 and a second ear portion 222 at two ends thereof. The first ear portion 221 has two parallel ear pieces being protruded from the first end 211 and adapted for slidably moving about the two side surfaces of the first guiding member 14 in a restricted manner. The second ear portion 222 has two parallel pieces being protruded from the second end 212 and adapted for slidably moving about two side surfaces of the second guiding member 19 in a restricted manner.

The first ear portion 221 provides an assembly hole 23 penetrating through the two ear pieces thereof where a first locking axle 24 is mounted therethrough. Therefore, when the first and second ear portions 221, 222 slidably move about the corresponding first and second guiding members 14, 19 in a restricted manner, the first locking axle 24 is able to switch positions between the open slot 15 and the locking slot 16. In addition, the second ear portion 222 provides a latch hole 25 penetrating through the two ear pieces thereof and in parallel with the first locking axle 24, so that a second locking axle 26 which is coupled with the second guiding member 19 can be mounted therethrough.

In addition, when the first end 211 of the main wall 21 presses the outside of first guiding member 14 to shut the opening 13, the first locking axle 24 is retained in the locking slot 16. However, as the first end 211 of the main wall 21 is detached from the first guiding member 14 and the opening 13 is in an openable condition, the first locking axle 24 is moved to open slot 15 position.

A timing gauge structure is composed of a sliding groove 31, a pair of rail members 32, and a block pin 33, wherein the sliding groove 31 which is penetrated through the two sides of the second guiding member 19, has a first closing end 311 adjacent to the opening 13 and a second closing end 312 distal from the opening 13. By coupling the second locking axle 26 with the sliding groove 31, the second blocking axis 26 is capable of moving along the sliding groove 31 with respect to the switching positions of the first locking axle 24 between the open slot 15 and locking slot 16. As for the rail members 32 and the block pin 3 are correspondingly provided between the second guiding member 19 and the second ear portion 222.

Particularly, the rail members 32 are riveted symmetrically and respectively at the front and rear sides of second guiding member 19 by rivets 321. The rail members 32 which are positioned adjacent to the second closing end 312 each has at least a platform 322 protruding from a surface of the second guiding member 19, a slope 323 connected the platform 322 with the surface of the second guiding member 19, and a rail 324 protruded from the surface of the platform 322 and connected to the slope 323. The rail 324 is framed by the second ear portion 222 and has an arc surface 3240 provided concentrically about the second closing end 311. The block pin 33 is affixed to the second ear portion 222 and adapted to move along with the rail 324.

Figure 3:
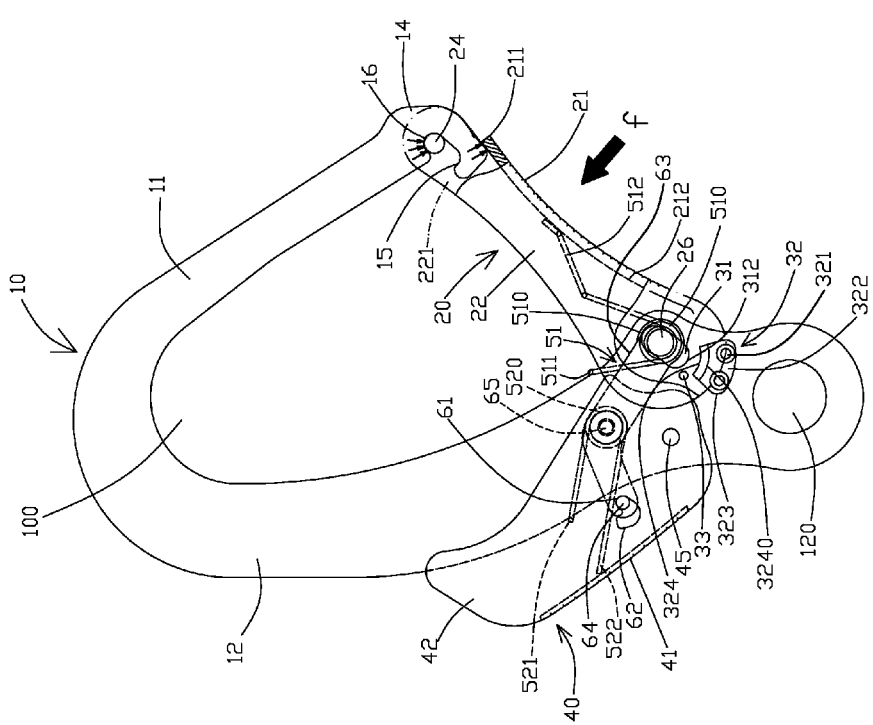
FIG. 3 is a schematic view illustrating a bearing force application during the locking condition of the present invention.

As shown in FIG. 3, when the first locking axle 24 is retained in the locking slot 16 to shut the opening 13, the first end 211 of the main wall 21 just presses against the outside of first guiding member 14. At this time, the block pin 33 is moved away from the rail 324 and located outside the slope 323 and positioned away from the rail 321.

Figure 5:
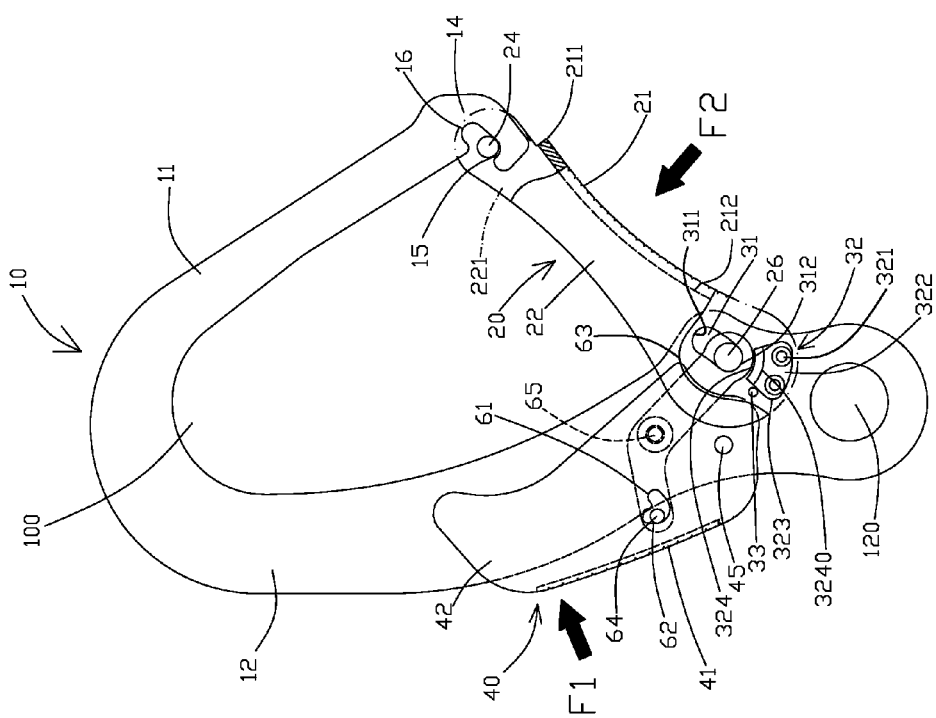
FIG. 5 is a schematic view illustrating a second action operation during the locking condition of the present invention.

Please referring to FIG. 5, when the first locking axle 24 is switched to the open slot 15 position and the second locking axle 26 enters the second closing end of the slide groove 31, the first end 211 of the main wall 21 is moved away from the first guiding member 14. At this time, the block pin 33 is able to enter an area of the arc surface 3240 of the rail 324. Therefore, when the first locking axle 24 of the locking member 20 is swung counterclockwise about the second locking axle 26 towards the hook cavity 100 to a predetermined position, the block pin 33 can be guided at the arc surface 3240 of the rail 324 to enable the locking member 20 to be guided by the arc surface 3240 to open the opening 13. In other words, the locking member 20 would be operated to open the opening 13 precisely at one time without any interference and impact.

Similarly, in order to shut the opening 13 by the locking member 20, simply by swinging the locking member 20 clockwise about the second locking axle 26, the block pin 33 can be guided by the arc surface 3240 of the rail 324 to move the first locking axle 24 precisely into the open slot 15 and, at the same time, the block pin 33 can be moved away from the rail 324 and located outside the slope 323 of the rail member 32, so that the first and second ear portions 221 222 of the locking member 20 could be operated and slidably moved about the first and second guiding members 14, 19 correspondingly in a restriction manner to switch the first locking axle 24 into the locking slot 16 while the first end 211 of the main wall 21 presses against the outside of the first guiding member 14, so as to shut the hook cavity 100.

A control grip 40, which comprises an end piece 41 positioned at an external side of the second arm 12 and two side pieces 42 connecting with the end piece 41 integrally, defines a groove 43 between the end piece 41 and the side pieces 42 adapted for embracing the two sides of the second arm 12. The two side pieces 42 form a center hole 44 therethrough at a position with respect to the main axial hole 17 for pivoting a center axle 45 between the center hole 44 and the main axial hole 17. A first end of the control grip 40 is able to be moved away from the second arm 12 while a second end of the control grip 40 provides a concave portion 46 to evade the locking member 20, so that as the first end of the control grip 40 is pushed toward the second arm 12, the control grip 40 would be swung clockwise about the center axle 45 as the fulcrum.

A first spring 51, which includes a positioning portion 510 surrounding the second locking axle 26, a first contacting element 511 biasing against a wall of the hook body 100, and a second contacting element 512 biasing against an inner surface of the main wall 21, is arranged to provide a momentum to monentarily shut the opening 13 and a momentum for the first locking axle 24 to move towards the locking slot 16.

A second spring 52, which includes a position portion 520 surrounding the center axle 45, a first contact element 521 biasing against the outside wall of the second arm 12, and a second contact element 522 biasing against an inner surface of the end piece 41, is arranged to provide a momentum to momentarily move away from the second arm 12.

An actuation structure has a limiting groove 61 provided at two side pieces 42 of the control grip 40 and a movement groove 62 intersected with the limiting grove 61, wherein the limiting grove 61 and movement groove 62 are located outside the second arm 12. The limiting groove 61 is a curve arrangement centering about the center axle 45 while the movement groove 62 is positioned farther than the limiting groove 61 from the second arm 12 and wider than that of the limiting groove 61, so as to enable a driving pin 64 switching between the limiting groove 61 and movement groove 62. A pair of V-shape actuation elements 63 is installed between the second ear portion 222 and two sides of the groove. A gang hole 631 is provided at a first end of each of the actuation elements 63 to pivot the second locking axle 26, and a driving hole 632 is provided at a second end of each of the actuation element 63 to pivot a driving pin 64. Each of the actuation elements 63 also has an opening hole 633 provided at a turning portion thereof with respect to the auxiliary axis hole 18, and that a pivot pin 65 is pivoted through the auxiliary axis hole 18 and the opening hole 633 to enable the actuation elements 63 to swing about the pivot pin 65. The movement groove 62 is a curve arrangement centering about the pivot pin 65. Therefore, when the second locking axle 26 is positioned or closed to the first closing end 311 to shut the opening 13 by the locking member 20, the driving pin 64 is positioned in the limiting groove 61, preventing the actuation elements 63 for any swinging movement to lock the second locking axle 26 in position, so as to retain the locking member 20 shutting up the opening 13 of the hook body 10.

Figure 4:
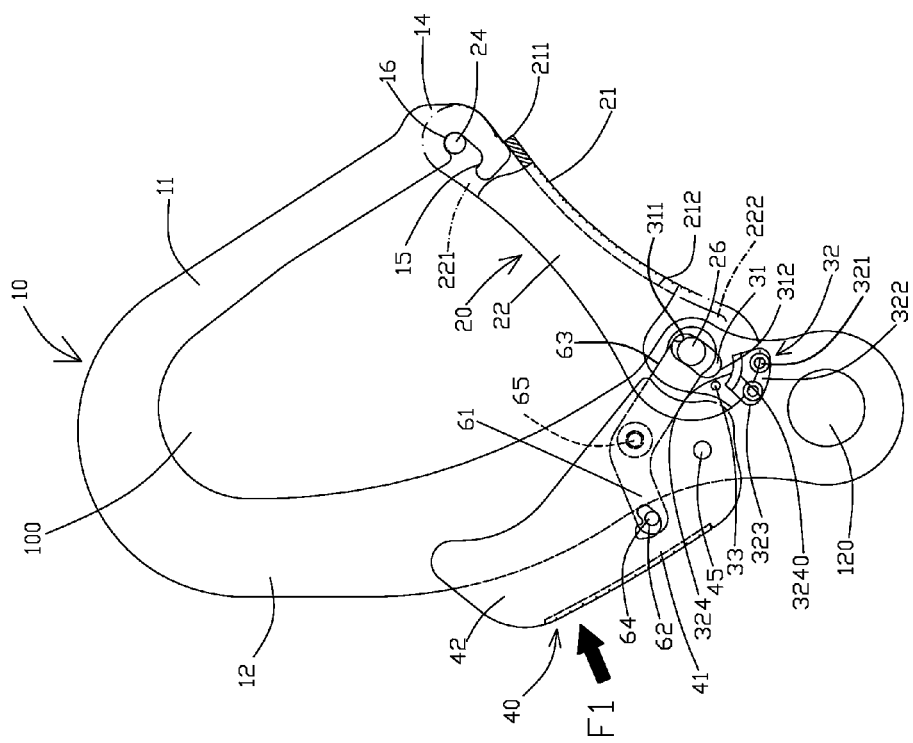
FIG. 4 is a schematic view illustrating a first action operation during the locking condition of the present invention.
Figure 6:
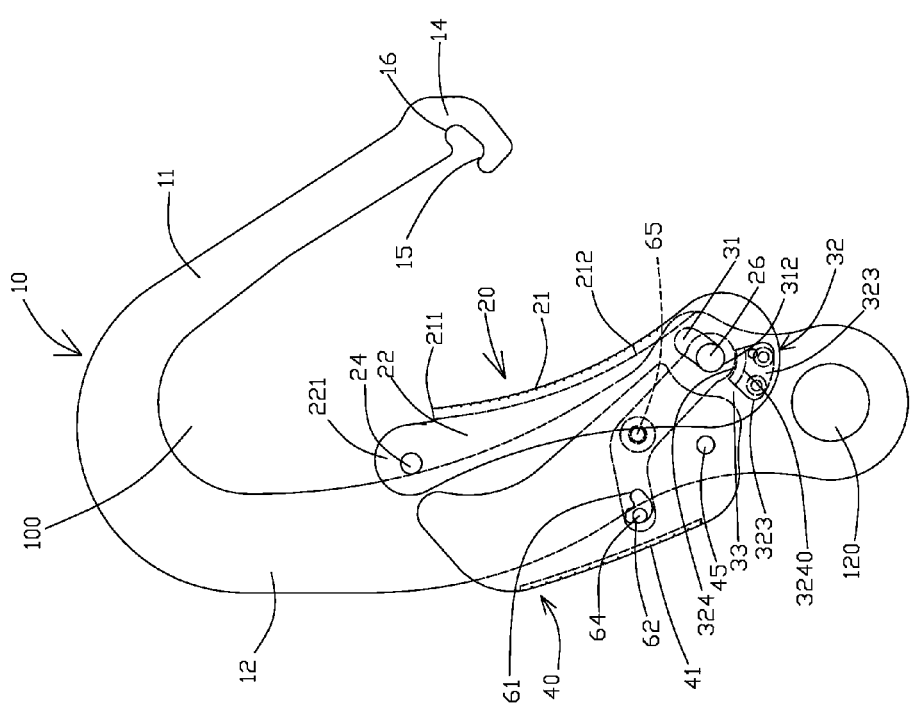
FIG. 6 is a schematic view illustrating a third action operation during the locking condition of the present invention.

As shown in FIG. 4, one can only switch the driving pin 64 to the movement groove 62 along the limiting groove 61 when one end of the control grip 40 approaching the second arm 12, so as to releasing the locking condition of the actuation elements 63 with respect to the second locking axle 26. Accordingly, the locking member 20 is able to be slidably moved, as shown in FIG. 5, in a restriction manner about the first and second guiding members 14, 19 to drive the second locking axle 24 to switch to the open slot 15, rendering the locking member 20 to be able to open the opening 13 of the hook body 10. Therefore, the locking member 20 can be swung about the second locking axle 26, as shown in FIG. 6, rendering the first locking axle 24 to be able to smoothly move in the hook cavity 100 to open the opening 13 for placing an object to be hooked therein or removing the hooked object therefrom.

Figure 7:
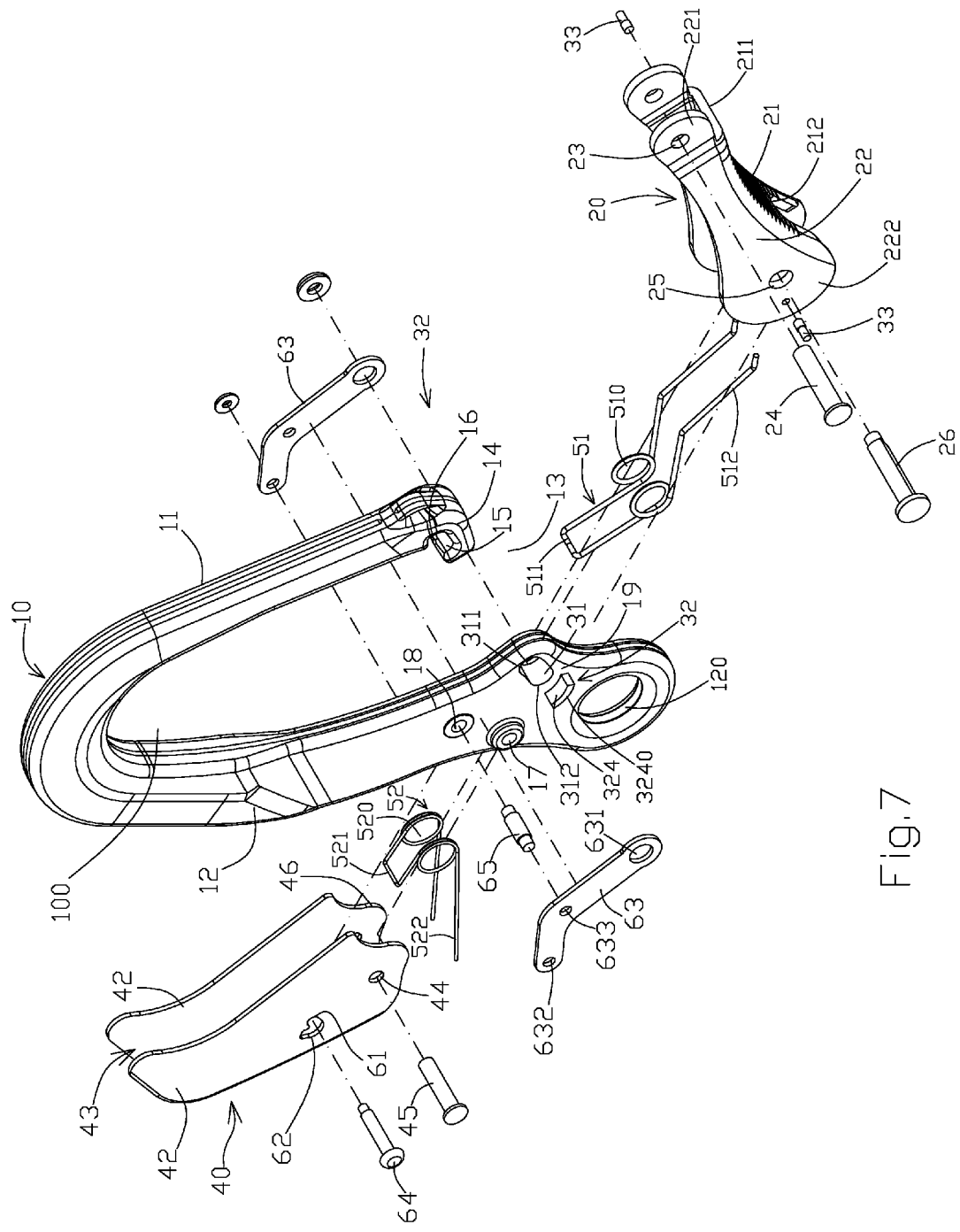
FIG. 7 is an exploded view illustrating an alternative mode of the above preferred embodiment of the present invention.

As shown in FIG. 7, an alternative mode of the preferred embodiment of the present invention is illustrated, wherein the rail member 32 is integrally protruded from the hook body 10 and that the arc surface 3240 of the rail 324 is protruded from the side surface of the hook body 10, so that when the locking member 20 is swung about the second locking axle 26 to open the opening 13, the block pin 33 of the locking member 20 can be guided by the arc surface 3240, so as to ensure the operation of the locking member 20 precisely at one time.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A precision safety ring-shaped hook, comprising:
a hook body having a hook cavity penetrating through two sides thereof, an opening communicating said hook cavity, a first guiding member provided at one end thereof, and a second guiding member provided at another end thereof, wherein said first guiding member is constructed to narrow a width of said opening and has an open slot formed in an inner side surface thereof and a locking slot extended from one end of said open slot; a locking member comprising a main wall and two side walls forming a U-shaped frame, said main wall having a first end and a second end, said two side walls having a first ear portion adapted for slidably moving about said first guiding member in a restricted manner and a second ear portion adapted for slidably moving about said second guiding member in a restricted manner, said first ear portion providing a first locking axle adapted for switching a position thereof between said open slot and said locking slot, said second ear portion providing a second locking axle adapted for coupling with said second guiding member; a first spring providing a momentum to drive said locking member to monentarily shut said opening; a timing gauge structure comprising two rail members and a block pin and having a sliding groove, said rail member being correspondingly provided between said second guiding member and said second ear portion and having an arc surface, said sliding groove penetrating through said second guiding member so as to couple with said second locking axle for slidably moving with respect to said locking member in a restricted manner, so that when said first locking axle is retained in said locking slot to shut said opening of said hook body, said first end of said main wall is biased against an outer surface of said first guiding member and, at the same time, said block pin is moved away from said arc surface, wherein when said first locking axle is moved to said open slot, said first end of said main wall is moved away said first guiding member and, at the same time, said block pin is moved to said arc surface, so that when said first locking axle is swung into said hook cavity, said block pin is moved to said arc surface and thus said locking member is guided by said arc surface to open said opening of said hook body.

2. The hook, as recited in claim 1, wherein said sliding groove has a first closing end adjacent to said opening and a second closing end distal from said opening, said rail members being provided at two side surfaces of said second guiding member correspondingly, each of said rail members being positioned adjacent to said second closing end of said sliding groove and having a platform protruding from a surface of said second guiding member, a slope connecting said platform with said surface of said second guiding member, and a rail protruded from a surface of said platform and connected to said slope, said arc surface of said rail provided concentrically about said second closing end, said block pin being affixed to said second ear portion for moving along said rail, so that when said first locking axle is retained in said locking slot, said block pin is moved away from said rail and located outside said slope and positioned away from said rail.

3. The hook, as recited in claim 2, further comprising: a control grip pivotally connected to said hook body via a center axle; a second spring providing a momentum to said control grip to momentarily move away from said hook body; an actuation structure having a limiting groove penetrating through said control grip for a driving pin positioned therein and a movement groove intersected with said limiting groove, a curvature of said limiting groove is configured corresponding to said center axle, wherein said actuation structure further comprises two actuation elements each having a middle portion pivotally connected to said hook body, a first end pivoted with said second locking axle, and a second end pivoted with said driving pin, wherein a curvature of said movement groove is configured corresponding to said middle portion of each of said actuation elements, so that when said second locking axle is positioned to shut said opening by said locking member, said driving pin is positioned in said limiting groove so as to lock said second locking axle by means of said actuation element, but when one end of said control grip is pressed, said actuation element is switched to said movement groove and release the locking of said second locking axle.

4. The hook, as recited in claim 3, wherein said control grip comprises an end piece and two side pieces forming a groove adapted for embracing said two sides of said hook body, wherein said actuation elements are installed between said second ear portion of said locking member and said two side pieces of said control grip, and that said limiting groove and said movement groove are penetrated through said two side pieces and located outside said hook body while said movement groove is positioned farther than said limiting groove from said hook body.

5. The hook, as recited in claim 3, wherein said first spring has a positioning portion surrounding said second locking axle, a first contacting element biasing against said hook body, and a second contacting element biasing against said main wall of said locking member.

6. The hook, as recited in claim 3, wherein said hook body comprises a first arm and a second arm, wherein a first end of said first arm is continuously extended to connect with a first end of said second arm defining a closing portion while a second end of said first arm and a second end of said second arm define said opening, wherein said first guiding member is provided at said second end of said first arm which slightly narrows a width of said opening, wherein said second arm has a main axial hole and an auxiliary axial hole penetrating through two sides thereof, wherein said main axial hole allows for pivoting of said control grip and said auxiliary axial hole is adapted for pivoting said middle portion of said respective actuation element with a pivot pin, wherein said second guiding member is extended from said second arm which slightly narrows said width of said opening.

7. The hook, as recited in claim 6, wherein each of said actuation elements has a V-shaped and said middle portion is located at a turning point thereof to form an opening hole therein for pivoting about said pivot pin.

8. The hook, as recited in claim 1, wherein said sliding groove has a first closing end adjacent to said opening and a second closing end distal from said opening, said rail members being integrally provided at two side surfaces of said second guiding member correspondingly, each of said rail members being positioned adjacent to said second closing end and having a platform protruding from a surface of said second guiding member, said block pin being affixed to said second ear portion for moving along said rail member.

9. The hook, as recited in claim 8, further comprising: a control grip pivotally connected to said hook body via a center axle; a second spring providing a momentum to said control grip to momentarily move away from said hook body; an actuation structure having a limiting groove penetrating through said control grip for a driving pin positioned therein and a movement groove intersected with said limiting groove, a curvature of said limiting groove is configured corresponding to said center axle, wherein said actuation structure further comprises two actuation elements each having a middle portion pivotally connected to said hook body, a first end pivoted with said second locking axle, and a second end pivoted with said driving pin, wherein a curvature of said movement groove is configured corresponding to said middle portion of said each of said actuation elements, so that when said second locking axle is positioned to shut said opening by said locking member, said driving pin is positioned in said limiting groove so as to lock said second locking axle by means of said actuation element, but when one end of said control grip is pressed, said actuation element is switched to said movement groove and release the locking of said second locking axle.

10. The hook, as recited in claim 9, wherein said control grip comprises an end piece and two side pieces forming a groove adapted for embracing said two sides of said to hook body, wherein said actuation elements are installed between said second ear portion of said locking member and said two side pieces of said control grip, and that said limiting groove and said movement groove are penetrated through said two side pieces and located outside said hook body while said movement groove is positioned farther than said limiting groove from said hook body.

11. The hook, as recited in claim 9, wherein said first spring has a positioning portion surrounding said second locking axle, a first contacting element biasing against said hook body, and a second contacting element biasing against said main wall of said locking member.

12. The hook, as recited in claim 9, wherein said hook body comprises a first arm and a second arm, wherein a first end of said first arm is continuously extended to connect with a first end of said second arm defining a closing portion while a second end of said first arm and a second end of said second arm define said opening, wherein said first guiding member is provided at said second end of said first arm which slightly narrows a width of said opening, wherein said second arm has a main axial hole and an auxiliary axial hole penetrating through two sides thereof, wherein said main axial hole allows for pivoting of said control grip and said auxiliary axial hole is adapted for pivoting said middle portion of said respective actuation element with a pivot pin, wherein said second guiding member is extended from said second arm which slightly narrows said width of said opening.

13. The hook, as recited in claim 12, wherein each of said actuation elements has a V-shaped and said middle portion is located at a turning point thereof to form an opening hole therein for pivoting about said pivot pin.

14. The hook, as recited in claim 1, further comprising: a control grip pivotally connected to said hook body via a center axle; a second spring providing a momentum to said control grip to momentarily move away from said hook body; an actuation structure having a limiting groove penetrating through said control grip for a driving pin positioned therein and a movement groove intersected with said limiting groove, a curvature of said limiting groove is configured corresponding to said center axle, wherein said actuation structure further comprises two actuation elements each having a middle portion pivotally connected to said hook body, a first end pivoted with said second locking axle, and a second end pivoted with said driving pin, wherein a curvature of said movement groove is configured corresponding to said middle portion of each of said actuation elements, so that when said second locking axle is positioned to shut said opening by said locking member, said driving pin is positioned in said limiting groove so as to lock said second locking axle by means of said actuation element, but when one end of said control grip is pressed, said actuation element is switched to said movement groove and release the locking of said second locking axle.

15. The hook, as recited in claim 14, wherein said control grip comprises an end piece and two side pieces forming a groove adapted for embracing said two sides of said hook body, wherein said actuation elements are installed between said second ear portion of said locking member and said two side pieces of said control grip, and that said limiting groove and said movement groove are penetrated through said two side pieces and located outside said hook body while said movement groove is positioned farther than said limiting groove from said hook body.

16. The hook, as recited in claim 14, wherein said first spring has a positioning portion surrounding said second locking axle, a first contacting element biasing against said hook body, and a second contacting element biasing against said main wall of said locking member.

17. The hook, as recited in claim 14, wherein said hook body comprises a first arm and a second arm, wherein a first end of said first arm is continuously extended to connect with a first end of said second arm defining a closing portion while a second end of said first arm and a second end of said second arm define said opening, wherein said first guiding member is provided at said second end of said first arm which slightly narrows a width of said opening, wherein said second arm has a main axial hole and an auxiliary axial hole penetrating through two sides thereof, wherein said main axial hole allows for pivoting of said control grip and said auxiliary axial hole is adapted for pivoting said middle portion of said respective actuation element with a pivot pin, wherein said second guiding member is extended from said second arm which slightly narrows said width of said opening.

18. The hook, as recited in claim 17, wherein each of said actuation elements has a V-shaped and said middle portion is located at a turning point thereof to form an opening hole therein for pivoting about said pivot pin.

* * * * *